(12) United States Patent
Rintz

(10) Patent No.: US 9,679,711 B1
(45) Date of Patent: Jun. 13, 2017

(54) PORTABLE PROGRAMMABLE DISPLAY AND CONTROL MODULE

(71) Applicant: William J. Rintz, Netcong, NJ (US)

(72) Inventor: William J. Rintz, Netcong, NJ (US)

( * ) Notice: Subject to any disclaimer, the term of this patent is extended or adjusted under 35 U.S.C. 154(b) by 8 days.

(21) Appl. No.: 14/641,166

(22) Filed: Mar. 6, 2015

Related U.S. Application Data

(60) Provisional application No. 61/948,995, filed on Mar. 6, 2014.

(51) Int. Cl.
| | |
|---|---|
| *G06F 1/16* | (2006.01) |
| *H05K 5/00* | (2006.01) |
| *H05K 7/00* | (2006.01) |
| *H05K 5/03* | (2006.01) |
| *H02G 3/14* | (2006.01) |
| *G06F 3/041* | (2006.01) |
| *F21V 33/00* | (2006.01) |
| *F21V 23/04* | (2006.01) |
| *H01H 9/02* | (2006.01) |

(52) U.S. Cl.
CPC .................. *H01H 9/0235* (2013.01)

(58) Field of Classification Search
CPC ... G06F 3/0482; G06F 3/0481; H05K 5/0017; F21L 4/00; F21V 19/00; F21V 19/0005; F21V 21/02; F21V 21/002; F21V 21/145; F21V 23/04; F21V 23/0414; F21V 23/0442; F21V 23/0457
USPC .... 455/566, 562.1, 41.2, 456.1, 41.1, 456.3, 455/557, 575.1, 552.1, 74, 74.1; 345/619, 345/107, 8, 173, 32, 208, 102, 100, 694, 345/163; 362/611, 95, 394; 710/303, 710/304, 1, 62; 248/346.03, 309.1, 426.1, 248/41.2, 917, 918, 205.1, 309.4; 361/679.43, 679.01, 679.55, 679.26, 361/679.03, 679.56, 679.41, 679.44, 361/679.4, 679.57, 679.02, 679.21, 679.3; 174/66, 67
See application file for complete search history.

(56) References Cited

U.S. PATENT DOCUMENTS

| | | | |
|---|---|---|---|
| 6,431,719 B1* | 8/2002 | Lau | A61M 21/02 362/23.18 |
| 9,405,395 B2* | 8/2016 | Feldstein | F16M 11/041 |
| 2009/0093276 A1* | 4/2009 | Kim | G06F 3/0482 455/566 |
| 2012/0033375 A1* | 2/2012 | Madonna | F16M 11/041 361/679.43 |
| 2012/0242684 A1* | 9/2012 | Kim | G06F 3/0481 345/619 |

(Continued)

*Primary Examiner* — Anthony Haughton
(74) *Attorney, Agent, or Firm* — Daniel S. Polley, P.A.

(57) ABSTRACT

A portable programmable display and control module which serves as a basic light switch and a digital custom light switch display. The control module can be removed from the electrical box when power fails to provide for an emergency flashlight. The control module can be provided with a mini-hard drive and microprocessor in order to be able to download digital content and display it on a lighted touch screen. The control module can also be controlled and programmed wirelessly by a computer or smart phone to control light switches, outlets, and other devices. The control module can also include a built-in solar cell to charge the module for prolonged power failures. A battery back-up can also be provided.

9 Claims, 1 Drawing Sheet

(56) References Cited

U.S. PATENT DOCUMENTS

| | | | |
|---|---|---|---|
| 2014/0253483 A1* | 9/2014 | Kupersztoch | H05B 37/02 345/173 |
| 2015/0109211 A9* | 4/2015 | Feldstein | F16M 11/041 345/173 |
| 2016/0057872 A1* | 2/2016 | Park | H05K 5/0017 362/611 |

* cited by examiner

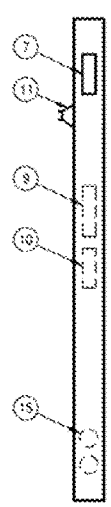
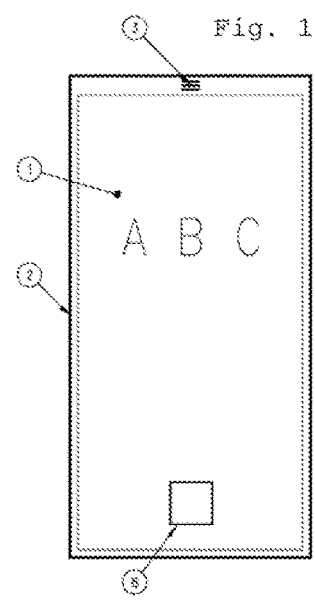
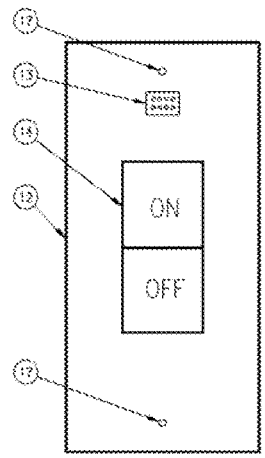
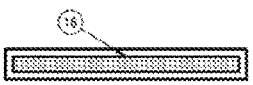
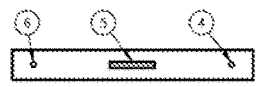

PORTABLE PROGRAMMABLE DISPLAY AND CONTROL MODULE

This application claims the benefit of and priority to U.S. Provisional Patent Application Ser. No. 61/948,995, filed Mar. 6, 2014, which is incorporated by reference in its entirety.

FIELD OF THE DISCLOSURE

The disclosure relates generally to the field of light switches.

BACKGROUND

There are currently light switches on the market that have increased functionality as compared to traditional light switches that merely turned a light on and off. Additionally, all light switches are rendered useless when there is a power failure. The present describes a novel light switch which provides further functionality as compared to current lights switches and also is operable during a power failure.

SUMMARY OF THE INVENTION

The present disclosure describes a custom light switches which expands on the functionality at the light switch, through, inter alia, the introduction, of a custom display and wireless remote control while also preferably incorporating certain functions of current light switches.

In a preferred embodiment it is disclosed a portable programmable display and control module which can serve as a basic light switch and a digital custom light switch display. The control module can be removed from the electrical box (i.e. an electrical box disposed within an internal wall of a house, building, etc.) when power fails to provide for an emergency flashlight and can transmit coordinates for first responders to use for locating an individual during an emergency (i.e. hurricane, earthquake, etc.). The control module can be provided with a mini-hard drive and microprocessor in order to be able to download digital content and display it on a lighted touch screen. The control module can also be provided with numerous solid state sensors to detect—heat, motion, carbon monoxide etc. The control module can also be controlled and programmed wirelessly by a computer or smart phone to control light switches, outlets, and other devices. The control module can also include a built-in solar cell to charge the module for prolonged power failures.

The control module can also be provided with an internal battery back-up system which allows for continued and enhanced use once conventional power is lost. In one non-limiting embodiment, the internal battery back-up can provide power for one or more or a plurality (e.g. 2, 3, etc.) super brite LEDs to illuminate and also provide power to Z WAVE chips to permit for continue functioning.

In addition to Bluetooth or WiFi, other current and/or later developed wireless protocols can be used for communication with the control module to provide for additional functionality. The control module can also preferably sync to a smart phone and control lights within a designated or specific range in applications, such as, but not limited to, hotels.

For a further detailed explanation of embodiments and operation for the above-referenced emergency flashlight, transmitting coordinates for first responders, solar cell and certain other features of the portable programmable display and control module and other features for a custom light switch, the Applicant incorporates by reference in their entireties, the entire disclosures of his previous filed U.S. patent applications, including, but not limited to, U.S. application Ser. No. 11/931,204 filed Oct. 31, 2007, U.S. application Ser. No. 11/858,580 filed Sep. 20, 2007, U.S. application Ser. No. 11/369,207 filed Mar. 6, 2006 now U.S. Pat. No. 7,273,983, U.S. application Ser. No. 10/912,746 filed Aug. 5, 2004 now U.S. Pat. No. 7,009,111, U.S. application Ser. No. 10/643,230 filed Aug. 18, 2003, U.S. application Ser. No. 10/094,746 filed Mar. 11, 2002 U.S. Pat. No. 6,608,253, U.S. application Ser. No. 09/550,532 filed Apr. 17, 2000 now U.S. Pat. No. 6,355,855, U.S. application Ser. No. 09/009,710 filed on Jan. 20, 1998 now U.S. Pat. No. 6,051,787, U.S. application Ser. No. 08/826,643 filed on Apr. 4, 1997 now U.S. Pat. No. 5,874,693, U.S. application Ser. No. 08/769,623 filed on Dec. 18, 1996 now U.S. Pat. No. 5,811,730, U.S. application Ser. No. 08/640,538 filed on May 2, 1996 now U.S. Pat. No. 5,811,729.

BRIEF DESCRIPTION OF THE DRAWINGS

FIG. 1 is a plan view of the preferred control module for the disclosed novel portable programmable display and control module;

FIG. 2 is a plan view of the preferred mounting bracket for the disclosed novel portable programmable display and control module;

FIG. 3 is a side of the control module of FIG. 1;

FIG. 4 is a top view of the control module of FIG. 1; and

FIG. 5 is a bottom view of the control module of FIG. 1.

DETAILED DESCRIPTION

The figures illustrate one non-limiting embodiment for the portable programmable display and control module. Reference numeral 1 represents a lighted touch screen. The outer perimeter for a custom frame is noted as reference numeral 2. Reference number 3 represents a built-in audio speaker. Thus, with speaker 3 built in, digital music can be sent from an electronic device (cell phone, mp3 player, computer, laptop, etc.) to the control module and heard through speaker by the occupant(s) of the room. This provides additional usefulness of areas of the room conventionally only used as for a light switch. Reference number 4 can be a plug in (port) (such as, but not limited to, a ¼" plug in) for downloading digital content 5. Digital content can also be received by various types of wireless technologies, including, but not limited to, a Bluetooth or WiFi connection. Reference number 6 can represent a USB port. An A/C/plug in 7 can be provided for portable charging. A volume control 8 can also be provided.

The control module is preferably synced up to an electronic device such as, but not limited to, smart phone, computer, laptop, tablet, etc. Once the control module is synced it provides or allows for the exchange data between the electronic device and control module. As an alternative to a direct synch up through a port/input on the control module, the electronic device and control module can be in communication through the internet wirelessly using UHF radio waves or other wireless technology. Furthermore, communication and the transfer of digital data can also be made via a wired connection such as Ethernet, USB port, ¼ phone jack on the bottom of the control module or other wired technology.

The lighted touch screen can be of various types such as, but not limited to, TFT LCD (thin film transistor) IPS-LCD, capacitive touch screen LCD, AMOLED, Retina display, Haptic/tactile touch screen, Gorilla glass or other light/display technology.

A main unlock button on the touch screen can be represented by reference number 9. The figures also show a mini hard drive 10, a microprocessor II, a mounting bracket plug in 12, an electrical mounting bracket 13 and a plug in port 14 for the display module. A manual on/off button 15 for the light switch can be provided for use when the module is removed (i.e. emergency flashlight, etc.). A built-in battery back up system 16 can also be provided for lighting the LEDS and for the above-mentioned location technology. The above referenced built-in solar cell can be provided for charging the display/control module during periods of prolonged power failures.

The module can be provided with internal memory and/or have a slot for external memory (i.e. sim disk). Amongst other things, the memory can be used for storing images, music, videos, etc. such that once downloaded into memory the images, music, videos can be displayed/played from memory without requiring further communication from a electronic device such as a cell phone, computer, notebook, tablet, laptop, etc.

All locations, sizes, shapes, measurements, amounts, angles, component or part locations, configurations, dimensions, values, materials, orientations, colors, etc. discussed above or shown in the drawings are merely by way of example and are not considered limiting and other locations, sizes, shapes, measurements, amounts, angles, component or part locations, configurations, dimensions, values, materials, orientations, colors, etc. can be chosen and used and all are considered within the scope of the invention.

Dimensions of certain parts as shown in the drawings may have been modified and/or exaggerated for the purpose of clarity of illustration and are not considered limiting.

In addition to microprocessor and mini-hard drioc, other conventional computer and electrical components (i.e RAM. ROM, memory, database, transmitters, receivers, etc.) will also be provided and contained, preferably within the housing, as needed to accomplish the above described functions. Additionally, various electrical connections or wiring will be provided between the various components, microprocessors, mini-hard drive, sensors, lights, speaker, solar cell, battery back-ups, etc.

The shape of the control module housing is not considered limited to the shown rectangular shape and can be any particular shape, including novel eye pleasing shapes to increase the aesthetics of the control module housing.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A programmable display and control module serving as a light switch that remains fixed at an electrical box of a building and powered through electrical connection to the electrical circuitry of the building during normal operations and which is removable and portable during a power failure at the building, comprising:

a housing having an outer perimeter serving as a frame;
a lighted touch screen disposed within the outer perimeter;
a microprocessor disposed within the housing, said lighted touch screen in communication with the microprocessor;
an internal battery back-up system disposed within the housing;
wherein said housing adapted for securement to an electrical box of a building in place of a conventional light switch assembly such that the microprocessor is powered by power from the building during normal operations and during a power failure at the building the housing is adapted for removal from its securement to the electrical box and the internal battery back-up system is electrically connected to the microprocessor to power the microprocessor during the power failure to allow the display and control module to serve as a flashlight;
wherein during normal operations with the microprocessor in electrical communication with the electrical circuitry of the building the microprocessor is programmed to act as a light switch for any lighting associated with the electrical box that the housing is secured to, wherein the microprocessor is programmed to turn on or off the lighting associated with the electrical box based on a user input through touching the lighting touch screen or through wireless commands received by the microprocessor from another electronic device through a wireless protocol.

2. The programmable display and control module of claim 1 further comprising a mounting bracket connected to the housing, the mounting bracket adapted for securing the housing to for mounting the control module at the electrical box during normal operation.

3. The programmable display and control module of claim 1 wherein the microprocessor adapted for synching with an external or non-connected electronic device to exchange data between the microprocessor and electronic device.

4. The programmable display and control module of claim 3 further comprising a speaker disposed within the housing and in communication with the microprocessor, wherein said microprocessor receives digital music from the electronic device which is heard through the speaker.

5. The programmable display and control module of claim 1 further comprising a hard drive in communication with the microprocessor, the microprocessor programmed to receive or download digital content to the hard drive and to display the downloaded digital content on the lighted touch screen.

6. The programmable display and control module of claim 1 further comprising one or more solid state sensors in communication with the microprocessor.

7. The programmable display and control module of claim 6 wherein the one or more solid state sensors is a heat sensor, a motion sensor or a carbon monoxide sensor.

8. The programmable display and control module of claim 1 wherein the internal battery back-up system including a solar cell.

9. The programmable display and control module of claim 8 wherein the light touch screen comprising a plurality of super brite LEDs which are powered by the internal battery back-up system during a power failure at the building.

* * * * *